April 6, 1937.  T. L. FAWICK  2,075,980
AUTOMOBILE DRIVE
Original Filed June 15, 1933   5 Sheets-Sheet 3
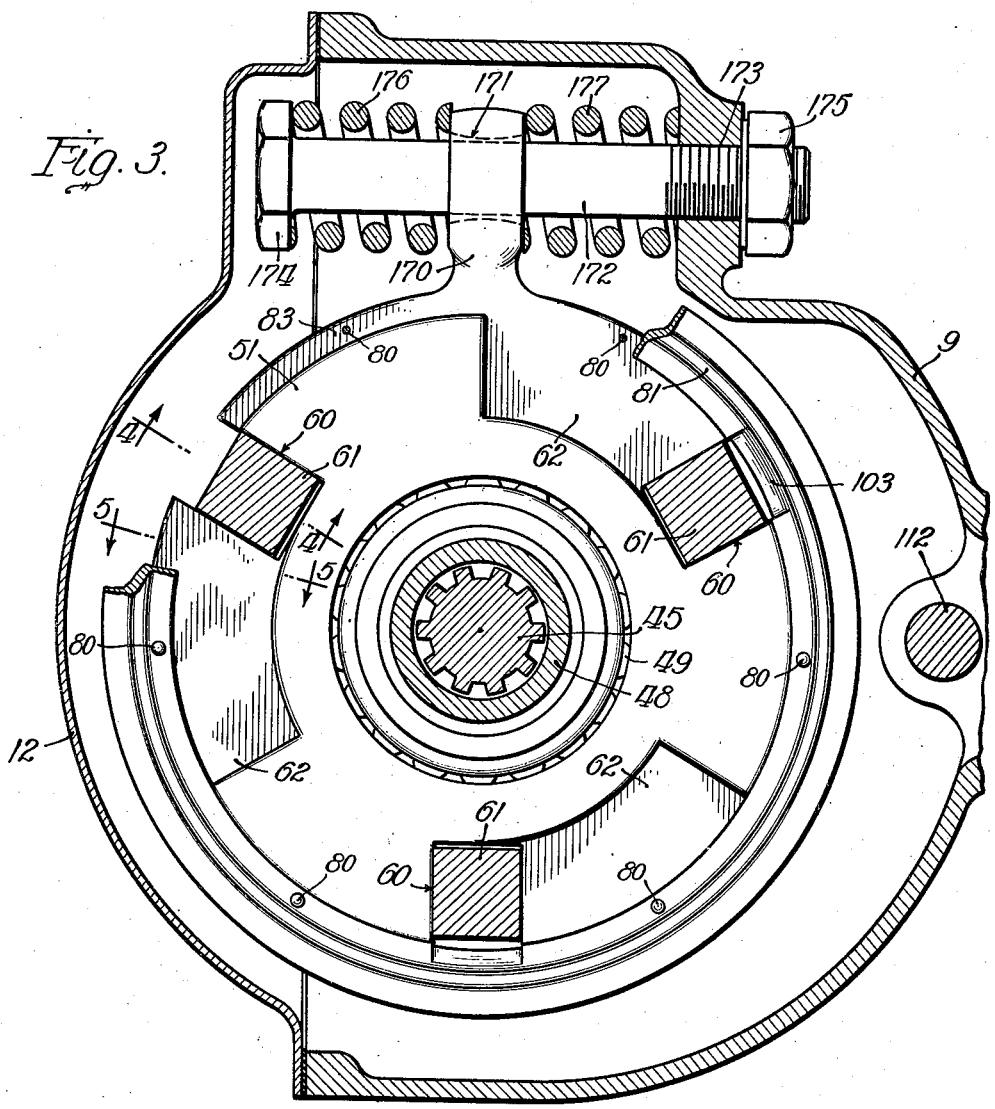
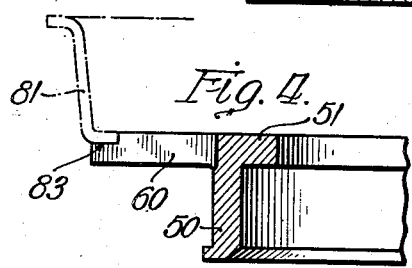
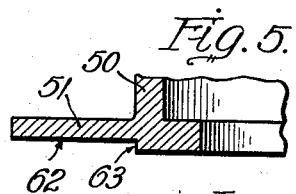
Inventor:
Thomas L. Fawick
By: Brown, Jackson, Boettcher & Dienner
Attys.

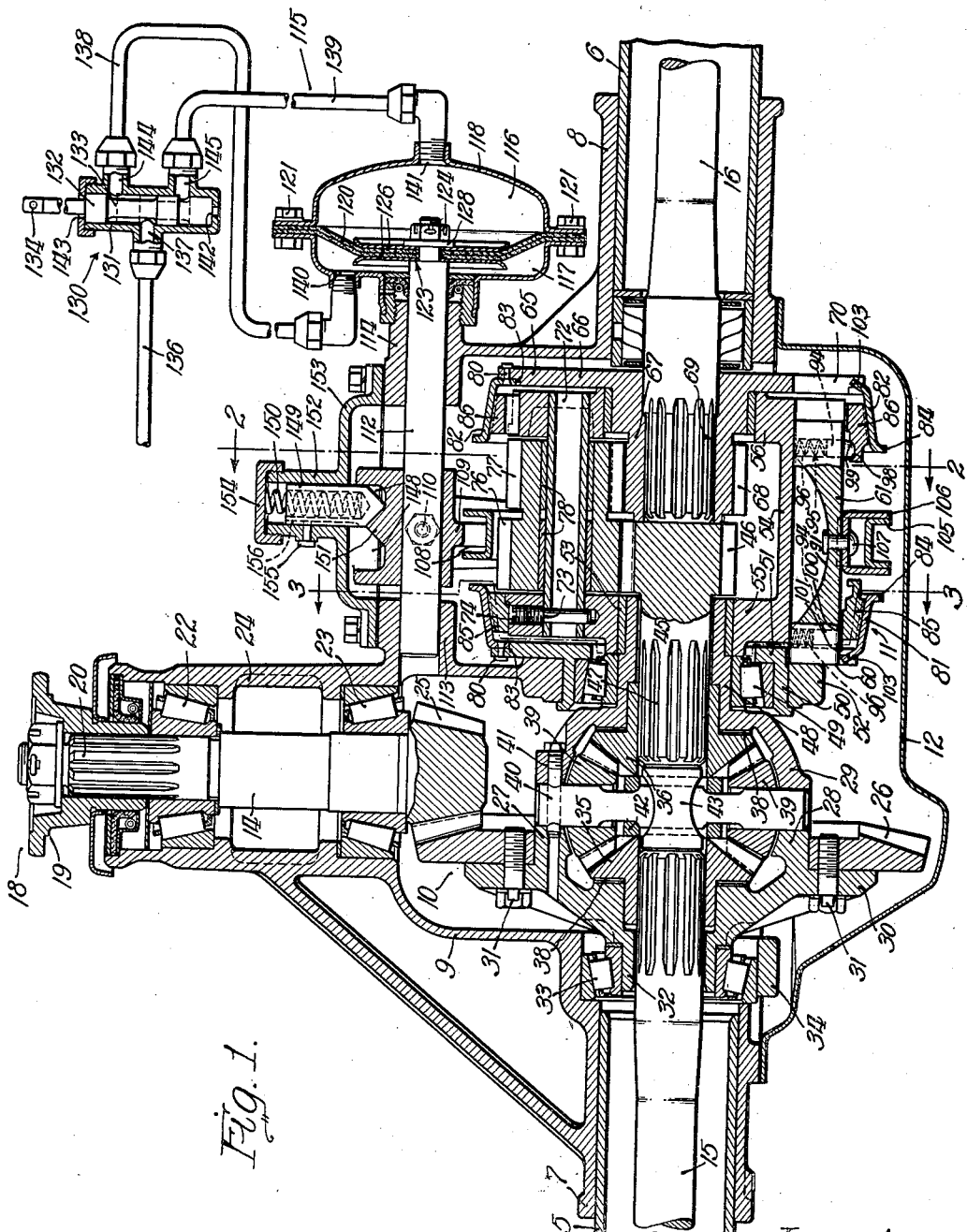

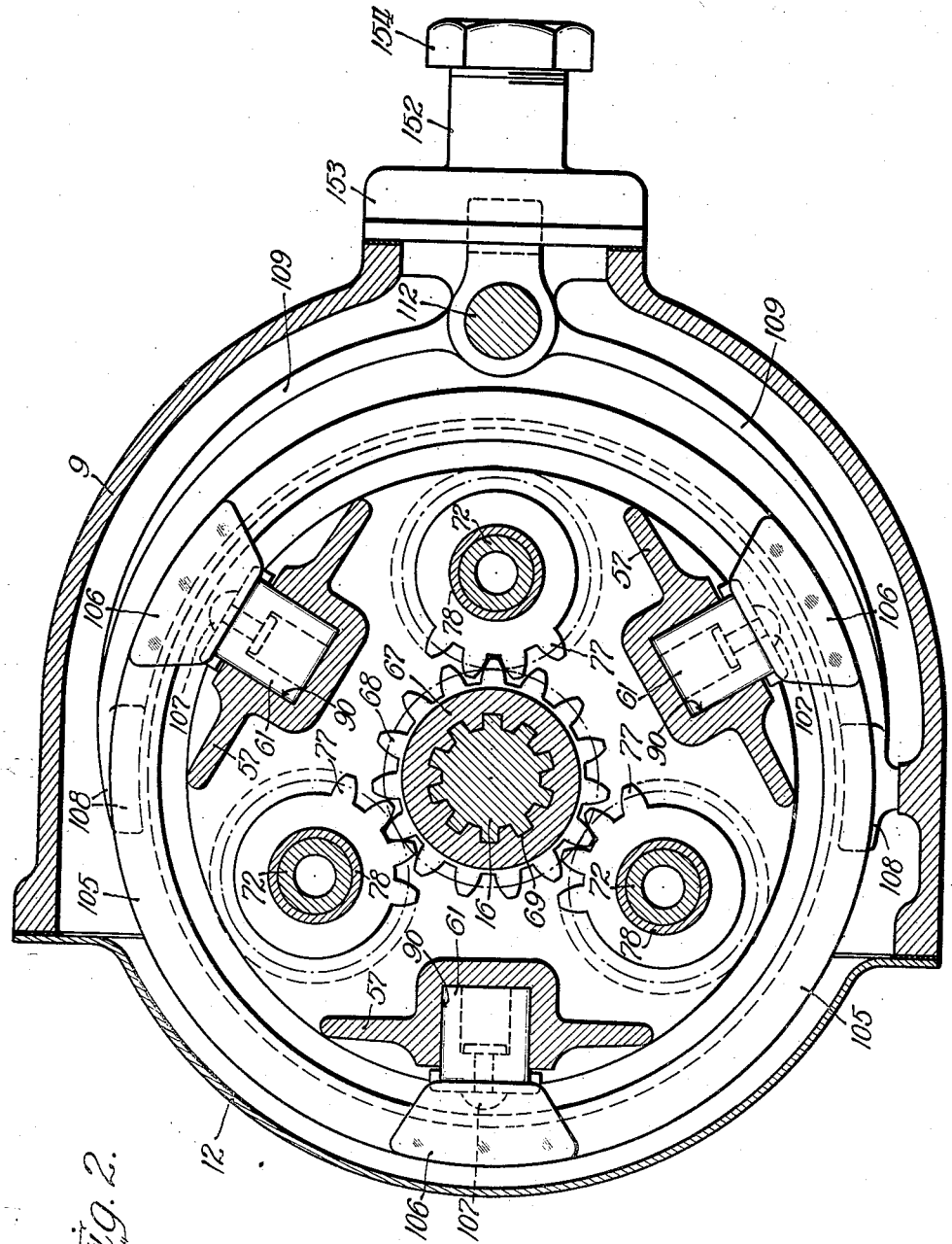

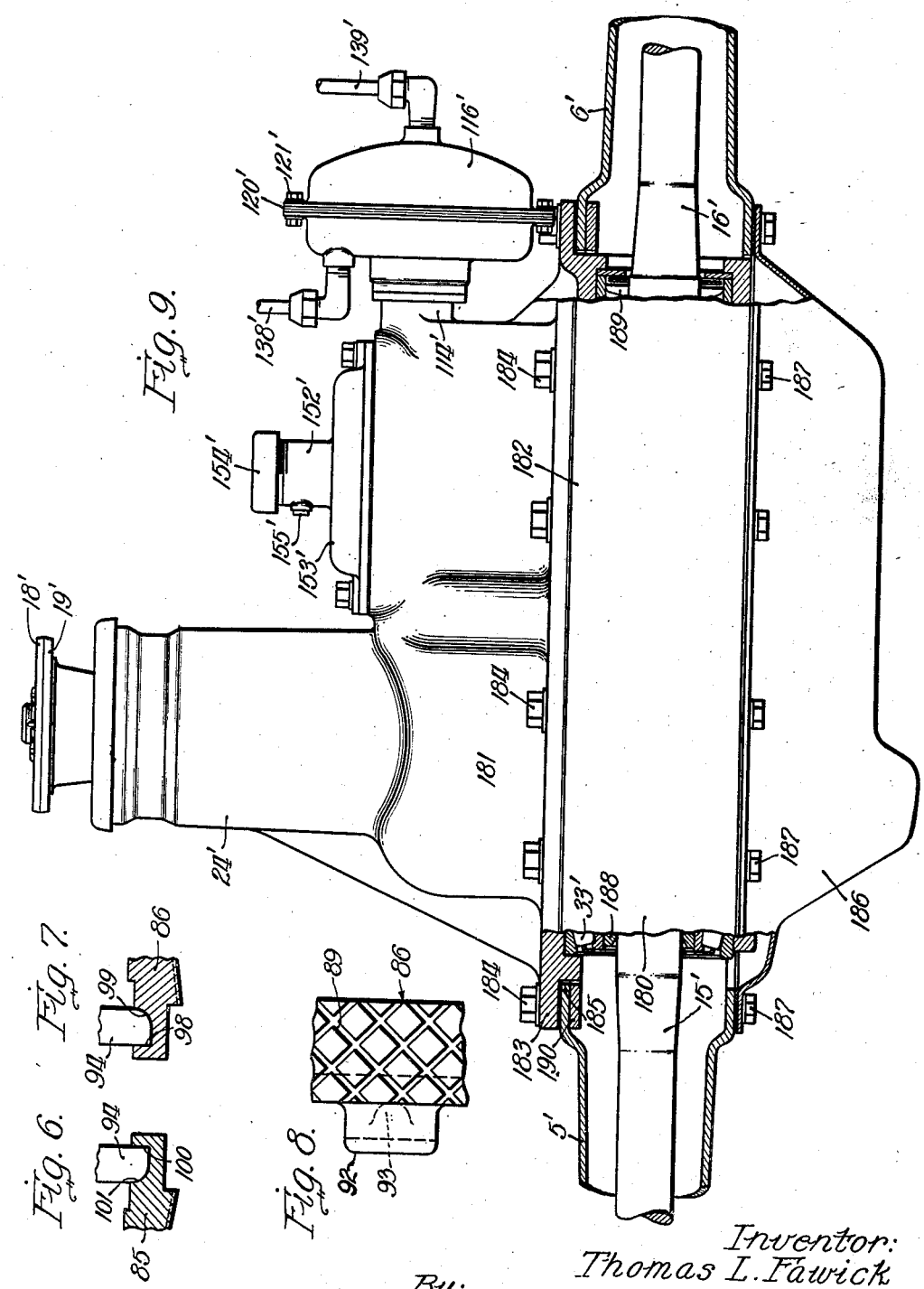

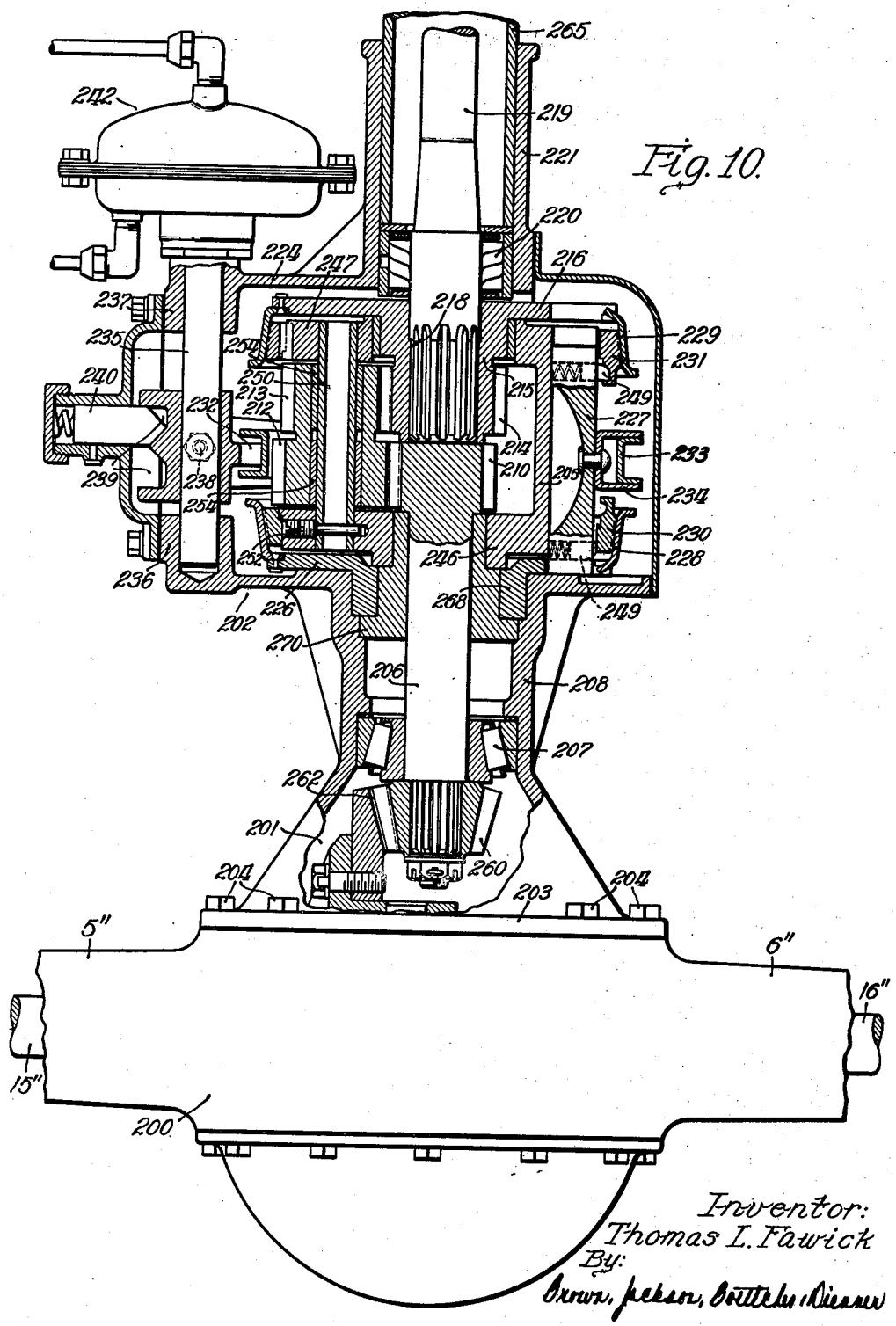

Patented Apr. 6, 1937

2,075,980

UNITED STATES PATENT OFFICE 2,075,980

AUTOMOBILE DRIVE

Thomas L. Fawick, Akron, Ohio, assignor to Borg-Warner Corporation, Chicago, Ill., a corporation of Illinois Application June 15, 1933, Serial No. 675,945
Renewed October 10, 1935

29 Claims. (Cl. 74—314)

My invention relates to driving mechanism for automobiles, trucks, and the like, and more particularly to a two-speed transmission which may be embodied in the rear axle drive or in the propeller shaft drive, or between the engine and the transmission; in fact, anywhere in the line of drive.

The present invention is in the nature of an improvement upon the invention disclosed and claimed in my prior Patent No. 1,792,485, patented February 17, 1931.

While I shall show and describe specific embodiments of the invention in a rear axle and in a propeller shaft drive, it is to be understood that the present invention may be embodied in any part of the drive in any desired manner. Also, while I show the transmission as providing either a direct or an under drive, it is to be understood that the under drive is merely illustrative of a gear ratio drive and that the relation may be reversed to provide an over drive instead of an under drive in connection with the direct drive. In fact, it merely depends on which direction the power comes from as to whether the transmission is a step-up or a step-down gearing.

In the specific embodiments, my invention has certain advantages not found in devices of the prior art, first of which is the relatively light weight and ease of manufacture and assembly. The parts are such as to be readily formed at minimum cost, simple operations on relatively small pieces only being required. The parts are readily assembled and supported when in place and the differential and transmission of my invention may be assembled in one unit on a bench assembly and then applied to the axle with minimum inconvenience and labor.

I provide for employment of a central axle casing in which casing the unitary assembly of differential and reduction gear may be mounted and the assembly and casing then applied between the live axle spindles and the tubular housing parts therefor. I provide also for employment of the so-called banjo axle frame, in which case the unitary assembly of differential and reduction gear may be mounted on a plate or frame bolted to one side of the banjo frame, and a cover member may be bolted to the other side. For the same reason that assembly is inexpensive, and convenient servicing of the device is accompanied with minimum difficulty and expense.

In the embodiment in a rear axle, a relatively large rear axle gear reduction or a relatively large step-up may be secured with minimum diameter of axle housing. This is a very desirable feature where a large reduction or large step-up is desired, but as previously practiced, would necessitate an extremely heavy and bulky housing.

In the embodiment in a propeller shaft drive, a relatively large gear reduction or a relatively large step-up may be secured also within minimum dimensions.

In the devices of the present invention, I employ a positive clutch for direct connection through the gear mechanism or transmission of my invention, and I employ also a positive clutch for obtaining the gear reduction or step-up drive through the transmission.

Another feature which is of importance in my invention resides in the provision of synchronizing or synchro-mesh means for the clutch for obtaining direct connection through the transmission of this invention, and also synchronizing or synchro-mesh means for the clutch for obtaining the ratio drive through the transmission. The synchronizing means is of relatively light weight and may be manufactured and assembled with ease. The parts of the synchronizing means are readily formed at minimum cost and are readily assembled and supported when in place. The synchronizing means is engaged or rendered operative in advance of the engagement of the clutch means for direct and ratio drive, and the shiftable clutch members are adapted to slip yieldingly with respect to the friction rings of the synchronizing means and into engagement with the direct and ratio drive clutch members after the synchronizing means is engaged or rendered operative. As the shiftable clutch means is moved from one position to the other, it acts to pick up and withdraw positively the synchronizing means from cooperation with the clutch part from engagement with which the shiftable clutch means is being withdrawn.

It is proposed to use the drive mechanism of the present invention without forward speed change gears next to the clutch housing, in which case only a reversing gear arrangement may be provided next to the clutch housing or between the universal at the rear end of the propeller shaft and the axle drive pinion, or in any other desired part of the drive. With the new types of cars with their powerful and high-speed engines not attained smoothly until very recently, it is possible that the two forward speeds provided in the present drive may be all that are necessary for the forward speeds of the motor car. Under present conditions, three and four speed transmissions may not be so much in demand and the two speed forward arrangement of the present invention and my prior patent above identified may replace the three speed units for standard make cars. It is to be understood, however, that the present invention may be used in connection with a one speed forward and reverse transmission just back of the clutch housing or otherwise positioned in the drive, in which case one shifter rod may be used for the lowest gear and reverse and the other for the two ratios or speeds obtainable through the present drive. It is to be understood further that the present drive may be used in connection with any suitable or desired transmission embodied and located in the drive as desired. Where the present drive is used in connection with another transmission, both may be operated by means of a single shift lever.

A buffer spring arrangement is provided to take the shock loads of shifting to the step-down or step-up axle ratio, and to absorb otherwise shock loads or vibrations.

While I shall show and describe a particular power shifting system making use of the vacuum in the inlet manifold of the engine for shifting the clutch means of my present invention into position for direct drive through the transmission and into position for ratio drive through the transmission, it is to be understood that the power shifting means may be modified from that shown, or that any other suitable or preferred shifting system may be employed within the scope of the present invention.

Further features and advantages and a concrete understanding of the present invention will be more apparent from the following detailed description taken in connection with the accompanying drawings, in which:

Figure 1 is a fragmentary horizontal section through a rear axle embodying my present invention;

Figure 2 is a section taken on the line 2—2 of Figure 1;

Figure 3 is a section taken on the line 3—3 of Figure 1;

Figure 4 is a fragmentary detail section taken on the line 4—4 of Figure 3;

Figure 5 is a fragmentary detail section taken on the line 5—5 of Figure 3;

Figures 6 and 7 are fragmentary detail sections showing the cooperation of the spring pressed plungers in the clutch bars with the slidable ring-like synchronizing members;

Figure 8 is a fragmentary plan view showing the friction surface of one of the slidable synchronizing members;

Figure 9 is a horizontal elevational view, partially in section and showing the present invention in connection with a rear axle of the banjo type;

Figure 10 is a horizontal section partially in elevation through the rear end of a propeller shaft drive showing the present invention incorporated therein ahead of the differential.

Referring first to the embodiment of the invention illustrated in Figures 1, 2, 3, 4, and 5, the rear axle housing comprises the tubular main axle shaft or live spindle housing parts 5 and 6, the inner ends of which are spaced apart axially and fit telescopically into tubular extensions 7 and 8 at opposite sides of the central axle casing 9. The two operating units, namely, the differential 10 and the change speed gearing 11, are mounted with the central axle casing 9. This casing 9 has an opening closed by a cover 12. The opening closed by the cover 12 is of a length suitable to expose not only the differential 10, but also the change speed gearing 11 when the cover 12 is removed. This cover 12 may be secured to the casing 9 by bolts, screws, or in any other suitable or preferred manner.

The tubular housing parts 5 and 6 at opposite sides of the casing 9 may terminate in flanged plates to which may be secured bearing housings for supporting suitable bearings (not shown) which may, in turn, support the rear wheels (not shown), or the wheels may be arranged and supported in any other suitable or preferred manner at the outer ends of the housing parts 5 and 6. Of course, the rear axle housing may be of the banjo type instead of the type shown in Figures 1 to 5, inclusive, as will hereinafter appear, or it may be formed in any suitable or preferred manner as well understood in the art.

The central axle casing 9, which houses the differential 10, is not symmetrical, but is formed to house or enclose also the change speed gear mechanism which is disposed at one side, in this case the right side, of the center of the rear axle. As a result of the disposition of the change speed gear mechanism, the live spindle 16 is shorter than the corresponding live spindle 15 as will be understood from the following description.

The pinion drive shaft 14, which is, in reality, an extension of the propeller shaft, is driven through a flexible coupling 18, only one side 19 of which is shown. The flange or fork member 19 of the universal joint is keyed at 20 to the propeller shaft section 14. The shaft 14 is supported in bearings 22 and 23 disposed in a tubular extension 24 of the casing 9. The inner end of the shaft 14 carries the driving pinion 25 which meshes with the ring gear 26 of the differential 10. This ring gear 26 is secured to the housing 27 of the differential 10. The housing 27 is formed in two parts; namely, the left side part 28 and the right side part 29. The housing 27 has a flange 30 to which the ring gear 26 is bolted or otherwise secured at 31, 31. The housing section 28 has an extension or neck 32 supported in the roller bearing 33. This roller bearing is mounted in a ring 34 which is preferably integral with the casing 9, or which may be part integral and part a split clamp member for forming a complete ring.

Within the differential housing 27, there are mounted the two cone gears 35 and 36 which have extending hubs to provide bearings for these gears within the housing sections 28 and 29. Hardened wear plates or rings 38 are interposed between the backs of the bevel gears 35 and 36 and the adjacent portions of the housing sections 28 and 29. The two gears 35 and 36 are connected together by differential pinions 39 which, in the present instance, are shown as mounted on a pin 40 held in place by a screw pin 41. A similar pair of pinions (not shown) may be mounted on extending pins projecting from the central hub or cage 42 to provide four such pinions between the bevel gears 35 and 36. Suitable wear plates for the outer ends of the pinions may be provided. A central block 43 which may permit a small amount of play endwise of the shafts 15 and 16 is supported on the pin 40. The shaft section 15 is splined at its inner end, and these splines fit into corresponding splines broached in the bevel gear 35. The bevel gear 36 has similar splines formed therein and a short shaft section 45 bearing a driving pinion 46 has the splines 47 at its inner end fitting into the splines in the bevel gear 36.

The hub or neck 48 of the housing section 29 is supported in a bearing 49 which, in turn, is mounted in a neck or hub extension 50 on a clutch plate 51. The neck or hub 50 of the clutch plate 51, in turn, is mounted for limited turning movement against a buffer spring or shock absorbing arrangement as will hereinafter appear in a ring 52 which forms a part of the casing 9, being either integral or split. The neck 48 is further extended and carries a bushing sleeve 53 for the cage 54 of the change speed gear mechanism 11.

The cage 54 comprises end rings or circular plates 55 and 56 joined by a plurality of webs, in this case three, as shown at 57 in Figure 2. The end plate or ring 55 is directly supported upon the neck or hub 48 which, in turn, is supported in the bearing 49.

The clutch plate 51 has a radially extending flange-like portion, which flange-like portion has a series, in the illustrated embodiment three recesses 60 which form clutch sockets for receiving the left hand ends (Figure 1) of a series of three shiftable clutch bars 61. The clutch sockets 60 extend far enough to receive the ends of the clutch bars 61 and, in fact, they may be milled or cut through the flange-like portion of the clutch plate 51 so as to provide sufficiently large bearings or shoulders for engaging the ends of the bars 61. Between the clutch sockets 60 the metal of the flange-like portion of the clutch plate 51 is left standing the full thickness of this flange-like portion with the exception of alternate clutch portions indicated at 62 in Figures 3 and 5 where the intervening metal is cut down at 63 from the surface presented to the bars 61 to substantially half the depth of the flange-like portion in order to assist the clutch bars 61 in proceeding into the clutch sockets or recesses 60 as will hereinafter appear.

At the opposite end of the cage 54 is the clutch plate 65 for obtaining the gear reduction or step-up drive through the transmission. This clutch plate 65 has the radially extending flange-like portion 66, the inner end of which has an integral hub or neck 67. The inwardly directed end of this hub or neck 67 has external teeth formed therein to constitute a pinion 68. The hub or neck 67 is splined at 69 and the live spindle 16 has splines fitting into the splines 69.

The radially extending flange-like portion 66 is similar to the radially extending flange-like portion of the clutch plate 51. It has three recesses 70 corresponding to the recesses 60 in the clutch plate 51. These recesses 70 form clutch sockets for receiving the right-hand ends (Figure 1) of the three shiftable clutch bars 61. Like the recesses 60, the recesses 70 extend far enough to receive the ends of the clutch bars 61 and may be milled or cut through the flange-like portion 66 to provide sufficiently large bearings or shoulders for engaging the ends of the bars 61. The flange-like portion 66 may be left standing its full thickness with the exception of alternate clutch portions where the intervening metal may be cut down from the surface presented through the bars 61 to substantially half the depth of the flange-like portions 66 in order to assist the clutch bars in proceeding into the clutch sockets or recesses 70 in the manner described in connection with the clutch plate 51.

The cage 54 has a series of pins or shafts 72, three in number in the present instance, mounted in the end plates 55 and 56 and suitably secured in the plate 55 as by means of screws 73, the inner reduced and unthreaded ends of which pass through diametrical openings in the adjacent ends of the shafts 72. Suitable lock studs 74 may be threaded in upon the outer ends of the screws 73 to lock the same in place. The shafts 72 may be of hollow or tubular construction as shown, which makes for light weight and low cost. The ratio drive gears 76 and 77 are preferably made integral and are provided with anti-friction bushings 78 bearing on the shafts 72. There are three sets of such ratio drive gears 76 and 77 arranged at equal intervals about the pinions 46 and 68, the gears 76 meshing with the pinion 46 and the gears 77 meshing with the pinion 68. The pinions 46 and 68 float loosely in the housing 5 and on the gears 76 and 77. These gears 76 and 77 support the pinions 46 and 68, which pinions 46 and 68, therefore, require no independent bearings. With this type gearing in the axle for ratio purposes and operating at such slow speeds as the differential and reduction gears run, there will be no noise at all from these gears, so that, so far as sound goes, the driver cannot tell one ratio from another. In addition, the speeds at which the parts travel with respect to each other is very low so that gear noises are not developed. If desired, however, the gears may be formed in a manner to reduce further any noises. The stresses on the individual teeth are maintained at relatively low values because of the three sets of gears 76 and 77 which are in mesh at all times with the pinions 46 and 68.

Secured, as by means of rivets 80, to the outer peripheries of the clutch plates 51 and 65 are generally conical friction or brake cup-shaped stampings 81 and 82 respectively. These stampings 81 and 82 open inwardly toward each other and surround the adjacent ends of the cage 54. The outer peripheries of the clutch plates 51 and 65 are scarfed at 83 so that the inner radial flange-like portions of the stampings 81 and 82, which flange-like portions are riveted or otherwise secured to the respective clutch plates at 80, will lie flush with the opposing surfaces of the plates 51 and 65. The opposing or inner ends of the stampings 81 and 82 may be flanged out at 84. The stampings 81 and 82 are readily formed at minimum cost and are relatively light weight.

Sliding synchro-mesh ring-like members 85 and 86 are disposed within the conical portions of the stampings 81 and 82. One of these ring-like members surrounds the end plate 55, and the other ring-like member surrounds the end plate 56. These members 85 and 86 may be bronze castings or die castings and their outer conical surfaces 88 may be cross-milled or otherwise suitably tooled at 89 to obtain the desired frictional action upon the inner conical surfaces of the stampings 81 and 82 upon frictional engagement of the rings therewith.

The clutch bars 61 are of square form and operate in square guides or ways 90 in the connecting webs 57 between the end plates 55 and 56. The ends of the bars 61 are solid and the intermediate portions are hollowed out from the inner sides at 91 for a purpose which will presently appear. Each ring-like member 85 and 86 has three projections 92, one adjacent each of the bars 61, and these projections have recesses or sockets 93 for cooperation with the outer ends of plungers 94 slidable radially in openings 95 in the solid ends of the bars 61. The plungers 94 are pressed yieldingly outwardly by coiled springs 96 disposed in the openings 95 and confined between the inner ends of the plungers 94 and the inner sides of the guides or ways 90. The outer left-hand corner of each right-hand plunger 94 is of square form at 98, and the right-hand corners are rounded at 99, the left-hand corners of the sockets 93 in the ring-like member 86 being of correspondingly square formation, and the right-hand corners of the sockets 93 being correspondingly rounded. The outer right-hand corners of the left-hand plungers 94 are of square form at 100 and the left-hand corners are rounded at 101, and the sockets 93 in the ring-like member 85 are similarly formed. For the purpose of holding the cup-shaped stampings 81 and 82 against relative circumferential movement with respect to the clutch plates 51 and 65 portions of the inner flanges of these stampings may be struck into the clutch sockets 60 and 70 as shown at 103 (Figure 1).

For shifting into gear ratio drive and into direct drive, a ring-like element 105 of channel-shaped section surrounds the cage 54. This ring-like element is held in channel-shaped clips 106, three in number in the present instance, spaced equidistantly circumferentially with one secured as by riveting at 107 to the intermediate hollowed out portion of each bar 61. The clips 106 may be in the form of stampings, as may the ring-like element 105, and the sides of the ring-element 105 may be spot welded or otherwise rigidly secured to the sides of these clips. The ring-like element 105 provides an annular groove in which are fitted the free ends 108 of the shifting fork member 109. The fork member 109, as is obvious from Figures 1 and 3, is mounted upon and secured at 110 to a longitudinally reciprocable shifter rod or shaft 112. The opposite ends of the shaft 112 are reciprocably mounted in bosses 113 and 114 on the casing 9, and in the illustrated embodiment the right-hand end of the shaft 112 extends out through the boss 114 and is connected with a power shifting mechanism indicated in its entirety at 115.

The particular power shifting mechanism selected for illustration makes use of the vacuum in the inlet manifold of the engine for shifting the present drive into gear ratio and into direct drive. It comprises a diaphragm housing 116 consisting of two complementary diaphragm housing parts 117 and 118, between the peripheral flanges of which the outer periphery of the diaphragm 120 is clamped as by suitable means such as the bolts 121. The adjacent end of the shaft 112 is reduced to form a shoulder 123 and the reduced end of the gap passes centrally through the diaphragm 120 and engages a nut 124 which secures the diaphragm centrally to the shaft 112. The diaphragm 120 is shown as being of two-ply construction, but this may vary. A pair of clamping stampings 126, one between the shoulder 123 and one side of the diaphragm, and the other between the other side of the diaphragm and a washer 128 positioned against the nut 124, distribute the gripping action over a relatively large area of the diaphragm and hold the same firmly to the shaft 112. The outer peripheries of these stampings or clamping discs 126 may be rounded away from each other as shown.

The vacuum control valve 130 comprises a generally cylindrical valve housing 131 having a valve member 132 reciprocable therein. The opposite ends of the valve member 132 have relatively tight sliding fit in the housing 131 and between said ends the valve member 132 is reduced at 133. An extension 134 projecting from one end of the valve member 132 is adapted to operate the valve 132 as, for example, from any suitable means disposed adjacent the driver's position, or otherwise as desired. The valve 132 may be operated by a button or finger piece on the steering post, or by the shift lever, or means thereon, and where the present device is combined with another transmission providing reverse and, if desired, additional forward speeds, the control means for the two transmissions may be interconnected as suitable or desired. Of course, means may be provided for shifting the present transmission into ratio drive and into direct drive manually instead of by means of a power shifting mechanism.

A conduit 136 leading from the intake manifold of the engine, or from any other suitable source of suction or vacuum, is connected and opens at 137 into the control valve housing 131 intermediate its ends. Conduits 138 and 139 are connected to and open from the housing 131 at opposite sides of the connection of the conduit 136 with the housing. The opposite end of the conduit 138 is connected and opens at 140 into one side of the diaphragm housing 116, and the opposite end of the conduit 139 is connected and opens into the opposite side of the diaphragm housing. The control valve housing 131 is vented to atmosphere at one end at 142, and at the opposite end along the extension 134 at 143. The ports 144 and 145 are so disposed with respect to the port 137 that, with the valve 132 positioned as shown, the vacuum or suction application port 137 is placed in communication with the port 144 around the reduced portion of the valve member 132. At the same time, communication between the ports 137 and 145 is closed and the port 145 is vented to atmosphere at 142. When the valve member 132 is moved to its dotted line position, the port 137 is placed in communication with the port 145 to connect suction to the opposite side of the diaphragm and the port 144 is vented to atmosphere at 143.

The hub of the shifter fork 109 is extended longitudinally and has notches or recesses 148 into which the lower end of a plunger 149 pressed by a spring 150 is adapted to snap to hold the parts in selected position. The lower end of the plunger 149 is wedge-shaped to cooperate with the wedge-shaped projection 151 between the recesses 148 to give a snap motion of the shifter and associated parts from one position to the other, and to prevent positioning the parts intermediate the two positions, or in any position other than the ratio drive and direct drive positions. The plunger 149 is slidable in a boss 152 on the cover plate 153 and the coiled spring 150 extends into the hollow interior of the plunger and is confined between the closed lower end of the plunger and a cap 154 threaded upon the top of the boss 152. A pin 155 passes through the side of the boss 152 and, at its inner end, into a groove or slot 156 in the plunger 149 to hold the same against turning in the boss 152. The construction of the snap mechanism and the construction of the shifter mechanism may be varied without departing from the present invention.

The operation of my present device is substantially like that of the construction disclosed in my prior Patent No. 1,792,485, with the exception of the positive clutches for both the direct connection and the gear ratio connection through the transmission and the synchronizing or synchromesh means for the direct and ratio drive connections.

Normally, the drive from the propeller shaft comes through the shaft section 14, through the flexible joint 18, driving the pinion 25 and ring-gear 26 of the differential. Here, the drive is transmitted to the pins 40 and pinions 39, of which, as previously explained, there may be any suitable number, preferably four, and the drive is then transmitted to the gears 35 and 36. Assume that the clutch bars 61 have been shifted to the left (Figure 1) and into engagement with the clutch sockets 60 in the clutch plate 51 so that the cage 54 is held to the plate 51 and, hence, against turning; the device is then in position for ratio drive therethrough. Under these circumstances, the drive from the differential pinions 39 is transmitted to the gears 35 and 36 at different rates to correspond to the rate of travel of the shaft section 45 and the live axle spindle 15. In other words, the differential operates to transmit a greater degree of motion to the bevel gear 36 than to the bevel gear 35 owing to the gear reduction between the pinion 46 and the pinion 68 through the gears 76 and 77. It will be seen that a portion of the movement is transmitted through the differential gears, but the reduction is nevertheless effective. As already pointed out, the ratio drive through the pinion 46, gears 76 and 77, and pinion 68, is shown as a reduction drive, but it is to be understood that the ratio drive may be a step-up connection.

When it is desired to shift from the speed reduction or ratio drive, afforded by the gears 11, to direct drive, the valve 132 is manipulated to apply vacuum or suction to the right-hand side of the diaphragm chamber 116 through the port 145. The opposite side of the diaphragm chamber is simultaneously vented to atmosphere at 143, and the diaphragm 120 is drawn to the right moving the shifter fork 109 and the clutch bars 61 to the positions in which the plunger 149 engages in the left-hand recess 148. As the bars 61 move to the right (Figure 1), the synchronizing cone or ring 86 moves as a unit therewith due to the engagement of the right-hand plungers 94 in the recesses in the ring 86, until the conical periphery of the ring 86 meets or engages the inner periphery of the cup-shaped stamping 82. Friction between the ring 86 and the stamping 82 brings the clutch bars 61 and clutch disc 65 to the same speed, and thereby permits the right-hand ends of the bars 61 to move silently into the clutch sockets 70 in the clutch plate 65. The right-hand plungers 94 are depressed inwardly by continued movement of the bars 61 after the synchronizing cone or ring 86 meets or engages the stamping 82, and this permits the clutch bars to slip yieldingly with respect to the ring 86 and into engagement with the clutch socket 70. As the shiftable clutch bars 61 are moved to the right, the left-hand plunger 94 will drop into the recesses in the left-hand synchronizing ring 85, and the square right-hand corners of these plungers 94 in cooperation with the correspondingly formed right-hand corners of the recesses in the ring 85 will permit the left-hand plungers 94 to act to pick up and withdraw positively the synchronizing member 85 from cooperation with the synchronizing drum or cup-shaped stamping 81. Thereupon the cage 54 is secured to turn with the axle spindle 15 through the clutch plate 65 and this, together with the engagement of the pinion 46 with the gear 76, and the engagement of the gear 77 with the pinion 68, together with the mounting of the shaft 72 for the gears 76, 77 in the cage 54, locks the parts together for direct drive through the transmission.

Under these circumstances, the drive from the pinions 39 is transmitted equally through the gears 35 and 36, and the differential rotates as a unit in the manner well known to differentials of this character, subject only to the different tractions upon the rear wheels. That is to say, the differential is able to differentiate in the same manner as any standard device of this character.

In shifting from direct drive to ratio drive, the control valve 132 is manipulated to apply vacuum to the left-hand side of the diaphragm chamber 116. The right-hand side of this chamber being vented at that time at 142, the shaft 112 is shifted to the left to the position shown in Figure 1. As the clutch bars 61 move to the left, the synchronizing ring 85 moves as a unit due to the engagement of the plungers 94 in the recesses in this member 85 until the conical periphery of the ring 85 meets or engages the inner periphery of the cup-shaped stamping 81. As is accomplished at the opposite end in shifting into direct drive, friction between the ring 85 and the stamping 81 brings the clutch bars 61 and clutch disc 51 to the same speed and thereby permits the left-hand ends of the bars 61 to move silently into the clutch socket 60 in the plate 51. In the left-hand movement of the bars 61, the right-hand plungers 94 operate to pick up and withdraw positively the synchronizing ring 86 from cooperation with the stamping 82.

I take the shock loads of shifting to the ratio drive, that is, to the reduction or step-up drive, and absorb otherwise shock loads or vibrations by means of a buffer spring arrangement shown in Figure 3. This buffer arrangement comprises an integral radial extension 170 on the clutch plate 51, which extension has an eye 171 through which passes a bolt 172 threaded and anchored at one end at 173 in the casing 9, and headed at its opposite end at 174. A lock nut may be provided at 175. Encircling the bolt 172 are a pair of compression springs 176 and 177, one of which is interposed between the head 174 and one side of the extension 170, and the other spring 177 is interposed between the opposite side of the extension 170 and the adjacent wall of the casing 9. The buffer spring arrangement holds the clutch plate 51 for ratio drive against rotation and at the same time permits yieldingly a limited turning movement of the plate 51 for the purpose of taking up the shock loads of shifting to the ratio drive, and to absorb otherwise shock loads or vibrations.

The present transmission has the specific virtue that the parts are solidly clutched, i. e., by positive jaw clutches when the device is in ratio drive as well as when it is in direct drive. Another virtue lies in the synchronizing means for the positive jaw clutches at both ends of the cage 54, that is, for the jaw clutch for ratio drive and for the jaw clutch for direct drive. This enables the jaw clutch at each end to be engaged silently and without noise or chattering, and at the same time as the jaw clutch at one end of the cage 54 is engaged the movement which engages this clutch withdraws positively the synchronizing means for the clutch engagement at the opposite end.

The ease of construction and bench assembly which the present device permits is of great value in assembling and servicing the device and, as already pointed out, the parts are all of low cost and light weight.

In the embodiment of Figure 9, the rear axle housing has a central open banjo axle frame 180 integral with the live spindle enclosing portions 5' and 6'. The left-hand live spindle is indicated at 15' and the shorter right-hand spindle is indicated at 16'. In this case, the unitary assembly of differential and reduction or ratio gear, the respective positions of which are shown generally at 181 and 182, are mounted upon a plate or front cover 183 bolted to the front side of the banjo frame by cap screws 184 and a clamping ring 190. The banjo frame opening 185 is of a length suitable to take not only the differential but also the change speed gearing, and a cover member 186 is bolted at 187 to the rear side of the banjo frame and closes the rear side of the banjo frame opening 185. The bearing for the neck or extension 188 on the left-hand differential housing section is indicated at 33', and the bearing for the inner end of the axle spindle 16' is indicated at 189. The tubular extension 24' on the plate or cover 183 corresponds with the tubular extension 24 of the preceding embodiment, and the other parts are similar to corresponding parts of the previous embodiment, and, where illustrated, are designated by primed reference characters corresponding with the reference characters used in connection with the preceding embodiment. Details not shown in this embodiment are similar to corresponding details in the previous embodiment, and the operation is substantially the same.

In the embodiment of Figure 10, the rear axle housing has the central open banjo axle frame 200 integral with the live spindle enclosing portions 5" and 6". The left-hand axle spindle is indicated at 15", and the shorter right-hand spindle is indicated at 16". The unitary assembly of differential 201 and change speed gearing 202 are mounted as in the preceding embodiment upon a plate or front cover 203 bolted to the front side of the banjo frame by cap screws 204, but in this case, the change speed or ratio gearing 202, instead of being disposed in the rear axle to one side of the differential 201, is incorporated in the propeller shaft drive ahead of the differential.

The propeller shaft drive has, at the rear or axle end thereof, a short shaft section 206. This shaft is supported in a bearing 207 in a tubular extension 208 of the cover 203. The forward end of the shaft 206 bears a pinion 210 which meshes with the ratio gear 212. The gear 212 has the second ratio gear 213 formed integral therewith, and this gear 213 meshes with the pinion 214 formed on the hub-like extension 215 of the clutch plate 216 for ratio drive. The extension 215 of the clutch plate 216 has splines 218 formed therein which splines fit splines on the shaft 219. The shaft 219 which is, in reality, an extension of the propeller shaft and may be driven through a flexible coupling (not shown) is supported in a bearing 220 disposed in the tubular extension 221 at the forward end of the casing 224 for the ratio drive gearing.

The casing 224 is shown as formed integral with the tubular extension 208 and, consequently, integral with the cover 203. The unitary ratio gearing and differential may be mounted in this combination casing and cover, and the entire assembly then applied as a unit in the propeller shaft drive ahead of the differential. The clutch plate for direct drive is indicated at 226. The shiftable clutch bars are indicated at 227 and the cup-shaped or generally conical synchronizing stampings for the direct and ratio drives are indicated at 228 and 229 respectively. The slidable synchronizing rings or cones for the direct and ratio drive clutch means are indicated at 230 and 231, and the shifter fork 232 engages in the channel shaped ring member 233 carried by the channel-shaped stampings 234, all substantially as in the embodiment of Figures 1 to 8, inclusive.

The shifter shaft is indicated at 235 journaled in bosses 236, 237 on the casing 224, and the hub of the fork member 232 secured upon this shaft at 238 has the recesses 239 with which the spring pressed plunger 240 cooperates as in Figure 1. The vacuum or power shifting mechanism is indicated in its entirety at 242. This mechanism is substantially the same as that shown in connection with the embodiment of Figures 1 to 8, inclusive, and the detailed description of the same will not be repeated here. The spring pressed plungers which are carried by the shiftable clutch bars 227 and which cooperate with the synchronizing rings or cones 230 and 231 are indicated at 249, and the end plates of the ratio gear cage 245 are indicated at 246 and 247. The shaft for the gears 212 and 213 is indicated at 250, this shaft being journaled at its opposite ends in the end plates 246 and 247, and secured at 252 in the end plate 246. The bushings between the shaft 250 and the gears 212 and 213 are indicated at 254, and the rear end of the short shaft section 206 carries the driving pinion 260 which meshes with the ring gear 262 of the differential 201. The torque tube 265 fits telescopically into the forward end of the neck extension 221 on the ratio gear casing 224. A buffer spring arrangement may be provided to take the shock loads of shifting to the gear ratio and to absorb otherwise shock loads or vibrations, such arrangement being employed with the clutch plate 226 for direct drive. The neck 268 of the clutch plate 226 is held against rotating by such buffer spring arrangement (not shown), but similar to that shown in Figure 1, the plate 226 having a limited turning movement as described in Figure 1. The bushing arrangement 270 may vary widely from that shown, and it is to be understood that suitable bearings may be employed instead of such bushing, if desired.

As in the embodiment of Figures 1 to 8 inclusive, the propeller shaft transmission of this embodiment has positive jaw clutches for both direct and ratio drive, and synchronizing means are provided for the positive jaw clutches for both drives through the transmission. The parts are light weight and inexpensive and, again, the ease of construction and bench assembly which this device permits is of great value in assembling and servicing the device.

I do not intend to be limited to the details shown or described.

I claim:

1. In a change speed gear, a driving pinion, a driven pinion, change speed gears connecting said pinions, a cage mounting said change speed gears, a pair of clutch members, one for one end of said cage and the other for the opposite end of said cage, means for rendering said clutch members operable, and means operable in advance of the rendering operative of said clutch members for bringing said clutch members and said cage to substantially the same speed.

2. In a change speed gear, a driving pinion, a driven pinion, change speed gears connecting said pinions, a cage mounting said change speed gears, a pair of clutch members, one for one end of said cage and the other for the opposite end of said cage, synchronizing ring members operable in advance of the rendering operative of said clutch members for bringing said clutch members and said cage to substantially the same speed, and means operable longitudinally of said cage for rendering said clutch members operative, said last means being shiftable through said synchronizing ring members irrespective of the angular positions of said ring members.

3. In combination, a driving pinion, a driven pinion, change speed gears connecting said pinions, a cage mounting said change speed gears, a clutch plate at one end of said cage, clutch bars mounted in said cage and slidable into and out of engagement with said clutch plate, and means operable in advance of the engagement of said clutch bars with said clutch plate for bringing the clutch bars and clutch plate to substantially the same speed to permit the bars to move silently into engagement with the clutch plate.

4. In combination, a driving pinion, a driven pinion, change speed gears connecting said pinions, a cage mounting said change speed gears, a clutch plate at one end of said cage, clutch bars mounted in said cage and slidable into and out of engagement with said clutch plate, means operable in advance of the engagement of said clutch bars with said clutch plate for bringing the bars and plate to substantially the same speed to permit the bars to move silently into engagement with said plate, said last means comprising a synchronizing ring member mounted on the clutch plate and having a generally conical inner surface, and a sliding synchronizing ring member actuated by said clutch bars and having a generally conical periphery for engagement with the conical inner surface of said first synchronizing member.

5. In combination, a driving pinion, a driven pinion, change speed gears connecting said pinions, a cage mounting said change speed gears, a clutch plate at one end of said cage, clutch bars mounted in said cage and slidable into and out of engagement with said clutch plate, means operable in advance of the engagement of said clutch bars with said clutch plate for bringing the bars and plate to substantially the same speed to permit the bars to move silently into engagement with the plate, said last means comprising a synchronizing ring member mounted on the clutch plate and having a generally conical inner surface, a sliding synchronizing member having a generally conical periphery for engagement with the conical inner surface of said first synchronizing member, and spring pressed plunger means carried by said clutch bars for moving the sliding synchronizing member into and out of engagement with said first synchronizing member and permitting the clutch bars to slip yieldingly with respect to said sliding synchronizing member and into engagement with said clutch plate.

6. In combination, a pair of synchronizing members, one movable into and out of engagement with the other, a slidable member for moving the movable synchronizing member into and out of engagement with the other synchronizing member, and a spring pressed plunger carried by said slidable member, said plunger being rounded at the leading corner in the direction of engagement of the movable synchronizing member with said other synchronizing member and presenting a positive abutment at the opposite corner, said movable synchronizing member having a recess conforming with the end of said plunger whereby said plunger may slip out of said recess in the direction of engagement of the movable synchronizing member with said other synchronizing member and is held against slipping out of said recess in the opposite direction.

7. In a motor vehicle, the combination of a propeller shaft, a rear axle having a pair of driving spindles for driving wheels, a differential gear connecting said propeller shaft and said spindles, one of said spindles being formed in two parts, a change speed gear connecting the adjacent ends of said two parts for changing the speed of both spindles by a change in speed in one spindle, dog clutch means for effecting direct drive through said spindles, said dog clutch means comprising a clutch plate and shiftable clutch bars, and a synchronizing ring member between said clutch plate and the adjacent ends of said clutch bars for synchronizing said plate and said bars, said bars being movable through said synchronizing ring member in all angular positions of said member.

8. In a motor vehicle, the combination of a propeller shaft, a rear axle having a pair of driving spindles for driving wheels, a differential gear connecting said propeller shaft and said spindles, one of said spindles being formed in two parts, a change speed gear connecting the adjacent ends of said two parts for changing the speed of both spindles by a change in speed in one spindle, dog clutch means on opposite sides of the adjacent ends of the two parts of the two-part driving spindle for effecting both the direct and ratio drives through said spindles, said dog clutch means including a plurality of clutch bars having recessed central portions, and a channel-shaped operating member extending around said bars and rigidly secured to the recessed portions thereof.

9. In combination, a driving pinion, a driven pinion, change speed gears meshing with said driving and driven pinions, a cage mounting said change speed gears, clutch plates at opposite ends of said cage, clutch bars mounted in said cage and slidable into and out of engagement with said clutch plates for direct and change speed drives, generally conical cup-shaped stampings, one mounted on each of said clutch plates, said cup-shaped stampings opening inwardly toward each other and surrounding the opposite ends of said cage, and slidable cone-surfaced ring members actuated by the movement of said clutch bars and cooperable with said cup-shaped stampings for bringing the clutch bars and clutch plates to substantially the same speed in advance of engagement of said bars with said plates.

10. In combination, a driving pinion, a driven pinion, change speed gears meshing with said driving and driven pinions, a cage mounting said change speed gears, clutch plates at opposite ends of said cage, clutch bars mounted in said cage and slidable into and out of engagement with said clutch plates for direct and change speed drives, generally conical cup-shaped stampings, one mounted on each of said clutch plates, said cup-shaped stampings opening inwardly toward each other and surrounding the opposite ends of said cage, slidable cone surfaced ring members actuated by the movement of said clutch bars and cooperable with said cup-shaped stampings for bringing the clutch bars and clutch plates to substantially the same speed in advance of engagement of said bars with said plates, a ring-shaped stamping of channel section surrounding said cage and said clutch bars and mounted upon said clutch bars, said ring-shaped stamping presenting an annular groove around the cage, and a shifter fork engaging in said groove for shifting said clutch bars.

11. In combination, a clutch plate, clutch bar means shiftable into and out of engagement with said clutch plate, a generally conical cup-shaped stamping mounted upon said plate and surrounding the adjacent end of the said clutch bar means, and a slidable cone-surfaced ring member movable into and out of engagement with said cup-shaped stamping by the movement of said clutch bar means, said ring member surrounding the adjacent end of said clutch bar means and surrounded by said cup-shaped stamping.

12. In combination, a clutch plate, clutch bar means shiftable into and out of engagement with said clutch plate, a generally conical cup-shaped stamping mounted upon said plate and surrounding the adjacent end of said clutch bar means, a slidable cone-surfaced ring member surrounding the adjacent end of said clutch bar means and surrounded by said cup-shaped stamping, and spring-pressed plunger means mounted in said clutch bar means and engageable with said cone-surfaced ring member for shifting the same into and out of engagement with said cup-shaped stamping.

13. In a change speed gear, a driving pinion, a driven pinion, change speed gears meshing with said driving and driven pinions, a cage mounting said change speed gears, means for effecting change speed drive from said driving pinion to said driven pinion through said change speed gears and for effecting direct drive between said pinions, synchronizing means for the direct and change speed drives, and shiftable clutch bars spaced about an axis through said driving and driven pinions and arranged to operate both said synchronizing means for direct drive and said synchronizing means for change speed drive.

14. In an axle, a central axle casing, a differential gear mounted in said casing, a change speed gear mounted in said casing, said differential and said change speed gear having splined sockets for receiving live spindles axially in alignment, said change speed bearing being connected to change the speed of both spindles by a change in speed in one spindle, clutch means enclosing and controlling said change speed gearing, a shiftable member for said clutch means operable within the axial limits of said clutch means, and tubular spindle enclosing parts telescopically engaged in opposite sides of said central axle casing.

15. In combination, an axle having an enlarged banjo frame, a frame and cover member for one side of the banjo frame, a differential gear having bearings mounted on the cover frame, a propeller shaft drive, a change speed gear incorporated in the propeller shaft drive and having bearing support on the frame and cover for one side of the enlarged banjo frame, said differential having splined sockets for receiving live axle spindles axially in alignment and said change speed gear having splined sockets for receiving propeller shaft sections axially in alignment, said change speed gearing comprising a driving pinion and a driven pinion, change speed gears meshing with said driving and driven pinions, a cage for said gears, clutch plates at opposite ends of said cage, clutch bars slidable in said cage into and out of engagement with said clutch plates, and synchronizing means at opposite ends of said cage for synchronizing said bars with respect to said clutch plates.

16. In a motor vehicle driving axle, a differential, a driving spindle on one side of said differential, inner and outer driving spindles on the opposite side of the differential, driving and driven pinions on adjacent ends of said last spindles, change speed gears connecting said pinions, a cage mounting said change speed gears, a clutch element on the outer driving spindle and at the outer end of said cage, a clutch element at the opposite end of the cage, a clutch element having an internal concave recess intermediate its ends and slidably mounted in said cage for movement into and out of engagement with said first mentioned clutch elements, and means comprising a channel-shaped operating ring rigidly secured to said last-named clutch element at said recess.

17. In a motor vehicle driving axle having axle driving shafts, a driving pinion, a driven gear, a planet gear cage connecting said pinion and gear, the combination of means for holding said cage against turning, a friction and positive clutch at either end of said planet gear cage, and a slidable clutch element mounted on said cage for effecting positive driving connection to one of the axle driving shafts and positive connection to said cage holding means, said slidable clutch element operating by movement in one direction the friction clutch at one end of the cage and by movement in the opposite direction the friction clutch at the opposite end of said cage.

18. In a motor vehicle driving axle, an axle housing, a carrier member mounting a driving pinion and a driven gear, bearings and a differential on said carrier member, said carrier member having attached to it a change speed gear mounted in a cage which is held against rotation in one ratio, and turns at drive shaft speed in another ratio, said cage having both friction and positive clutch elements at either end of said cage, and a clutch element slidably mounted in said cage and engageable with the clutch elements on either end of said cage to obtain two different ratios.

19. In a motor vehicle driving axle, a differential, a driving spindle on one side of said differential, inner and outer driving spindles on the opposite side of the differential, driving and driven pinions on adjacent ends of said last spindles, change speed gears connecting said pinions, a cage mounting said change speed gears, a clutch element on the outer driving spindle and at the outer end of said cage, a clutch element at the opposite end of the cage, friction means carried at each end of said cage for selective engagement with one of said clutch elements, and dog clutch means shiftable longitudinally of said cage to initially engage said friction means with one of said clutch elements and to subsequently effect direct clutching engagement with said engaged clutch element.

20. In a motor vehicle driving axle, a differential comprising a differential housing supporting differential gears, said differential housing having an extending hub, driving spindle means connected with and extending from said differential, a change speed gear associated with said spindle means and including a cage rotatably bearing at one end on the hub extending from said differential housing and at the opposite end upon said driving spindle means, change speed gears mounted in said cage, and clutch means carried by and shiftable longitudinally within said cage for clutching said cage to its outer bearing support for conjoint rotation therewith.

21. In a motor vehicle driving axle, a differential gear structure, driving spindle means extending from said differential gear structure, change speed gearing interposed therebetween including a cage rotatably supported at one end on said differential structure and at the opposite end on said driving spindle means, synchronizing plates carried at opposite ends of said cage, a clutch element at each end of said cage, one of said clutch elements being formed integral with said driving spindle means, cones on said clutch elements adapted to be engaged frictionally by said synchronizing plates, and clutch means shiftable longitudinally within said cage for selectively engaging one of said plates with one of said cones while withdrawing the other plate from the other of said cones.

22. In a change speed gearing for a transmission of the class described, a differential, a first driving spindle, a second driving spindle axially aligned therewith, a change speed gearing interposed between said spindles including a rotatable cage, a clutch element mounted for limited rotation at one end of said cage, a clutch element keyed to said second driving spindle at the opposite end of said cage and supporting said opposite end of said cage, a plurality of longitudinally shiftable clutch members carried by said cage, synchronizing friction plates resiliently carried adjacent the ends of said clutch members and shiftable therewith, said plates selectively engaging said clutch elements upon shifting of said clutch members, and means rigidly secured to said clutch members centrally thereof for receiving an operating member to effect conjoint shifting of said clutch members.

23. In a change speed gear, a driving pinion, a driven pinion, change speed gears meshing with said driving and driven pinions, a mounting for said change speed gears, a positive clutch member shiftable in opposite directions, a positive clutch member engaged by said first clutch member to effect change speed drive from said driving pinion to said driven pinion through said change speed gears when said first clutch member is shifted in one direction, a positive clutch member engaged by said first clutch member to effect direct drive between said pinions when said first clutch member is shifted in the opposite direction, synchronizing clutch means actuated by the shifting movement of said first clutch member in one direction for synchronizing the parts in effecting change speed drive, and synchronizing clutch means actuated by the shifting movement of said first clutch member in the opposite direction for synchronizing the parts in effecting direct drive.

24. In a change speed gear, a driving pinion, a driven pinion, change speed gears meshing with said driving and driven pinions, a mounting for said change speed gears, means for effecting change speed drive from said driving pinion to said driven pinion through said change speed gears, said means comprising a first clutch plate at one end of said change speed gears, a second clutch plate at the opposite end of said change speed gears and rigidly connected to said driven pinion, positive clutch means shiftable into positive engagement with said first clutch plate for ratio drive and into positive engagement with said second clutch plate for direct drive, a synchronizing clutch having yielding actuating connection with said shiftable clutch means to be engaged by actuation of said shiftable clutch means in one direction, and a synchronizing clutch having yielding actuating connection with said shiftable clutch means to be engaged by actuation of said shiftable clutch means in the opposite direction.

25. In a change speed gear mounted in an axle, driving gear means, driven gear means, intermediate gearing, a mounting for said driving gear means, driven gear means and intermediate gearing, means for effecting different speed drives from said driving gear means to said driven gear means, and friction synchronizing clutches and positive driving clutches for said different speed drives, said friction synchronizing and positive clutches being disposed adjacent said axle and at opposite ends of said intermediate gearing.

26. In a driving motor vehicle axle, change speed gearing, driving gear means, driven gear means, intermediate gearing, mounting means for said gearing, means for effecting change speed drive from direct drive to change speed drive, and friction synchronizing clutches and positive clutches for the change speed drive and direct drive, said friction synchronizing and positive clutches being disposed adjacent said axle and at opposite ends of said intermediate gearing.

27. In a driving axle, a driving pinion, a meshing bevel gear, differential gearing, a live axle spindle, means for obtaining a one-to-one ratio and a geared ratio between said differential and said live axle spindle, said means including a positive clutch for the one-to-one ratio and a positive clutch for the geared ratio, and friction synchronizing clutches at each positive clutch, the friction synchronizing and positive clutches for the geared ratio being resiliently mounted for limited rotation.

28. In combination, a driving shaft, a driven shaft coaxial with said driving shaft, a pair of ratio gears, one on said driving shaft and one on said driven shaft, a second pair of ratio gears, one constantly in mesh with one of said first gears and the other constantly in mesh with the other of said first gears, a cage for said second pair of ratio gears, friction synchronizing and positive clutch means for holding said cage against turning to produce a ratio drive between said shafts, and friction synchronizing and positive clutch means for securing the cage to turn with the driven shaft for direct drive between said shafts.

29. In combination, a driving shaft, a driven shaft coaxial with said driving shaft, a driving gear on said driving shaft, a driven gear on said driven shaft, ratio gears meshing with the gears on the driving and driven shafts for providing a geared ratio between said shafts, means for locking said ratio gears against movement about the axis of said driving and driven shafts for ratio drive and to said driven shaft to provide direct drive between said shafts, friction synchronizing and positive clutches for the geared ratio drive between said shafts, and friction synchronizing and positive clutches for the direct drive between said shafts.

THOMAS L. FAWICK.